United States Patent
Palmieri (10) Patent No.: US 8,578,276 B2
(45) Date of Patent: Nov. 5, 2013

(54) DYNAMIC ADAPTIVE CROSS-SITE CUSTOM INTERFACE

(75) Inventor: John Palmieri, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 866 days.

(21) Appl. No.: 12/324,772

(22) Filed: Nov. 26, 2008

(65) Prior Publication Data

US 2010/0131853 A1 May 27, 2010

(51) Int. Cl.
*G06F 3/00* (2006.01)

(52) U.S. Cl.
USPC ............ 715/740; 715/735; 715/736; 715/741

(58) Field of Classification Search
USPC .......... 715/762, 733, 765, 734–736, 740, 741
See application file for complete search history.

(56) References Cited

U.S. PATENT DOCUMENTS

| | | | | |
|---|---|---|---|---|
| 6,105,021 A | * | 8/2000 | Berstis | 707/999.003 |
| 6,260,061 B1 | * | 7/2001 | Krishnan et al. | 709/213 |
| 2002/0010781 A1 | * | 1/2002 | Tuatini | 709/227 |
| 2006/0271637 A1 | * | 11/2006 | McKeon et al. | 709/217 |

* cited by examiner

*Primary Examiner* — Weilun Lo
*Assistant Examiner* — Truc Chuong
(74) *Attorney, Agent, or Firm* — Lowenstein Sandler LLP (57) ABSTRACT

The system includes a user interface module to receive a request to access a dynamic adaptive custom user interface and to generate a dynamic adaptive custom user interface. The user interface module configures the user interface with one or more application modules, where each application module utilizes a data set provided by an application server. The user interface module uses a proxy module to obtain the data set from the application server. The user interface module populates the user interface with the data set from the application server and provides the dynamic adaptive custom user interface having the data set provided by the application server.

22 Claims, 11 Drawing Sheets

DYNAMIC ADAPTIVE CROSS-SITE CUSTOM INTERFACE

TECHNICAL FIELD

Embodiments of the present invention relate to a method and system for providing a user interface to access data provided by one or more servers. Specifically, the embodiments of the present invention relate to a method and system for providing a dynamic adaptive cross-site custom user interface to access and manipulate data provided by one or more application servers.

BACKGROUND

Software development requires the use of various application servers, each server providing a different user interface. As a result, there is a lack of cohesiveness when an application programmer accesses the various servers. In addition, manually accessing a number of application servers to develop software is an inconvenience to application programmers. For example, an application programmer logs in to a build server to determine the status of a build, to perform a re-build, etc. However, if the application programmer were to perform a translation on the same software package, the application programmer needs to access a different server (e.g., a translation server).

In addition, when companies merge and attempt to merge their applications the result is an inconsistent look and feel between the applications. Typically, applications are written in different programming languages (e.g., Java, Python) and are simply be stitched together by inserting weak links directly between the applications. To alleviate the problem, companies take applications originally written in Python and rewrite them in Java or decide to scrap the applications all together and start from scratch.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Described herein is a method and system for providing a dynamic adaptive custom user interface to access and manipulate data provided by one or more application servers. The system includes a user interface module. The user interface module receives a request to access a dynamic adaptive custom user interface and generates a dynamic adaptive custom user interface. The user interface module configures the user interface using one or more application modules, where each application module utilizes a data set that is provided by an application server running a backend application. The user interface module uses a proxy module to obtain the data set from the application server. The user interface module populates the user interface with the data set from the application server and provides the dynamic adaptive custom user interface having the data set provided by the application server. This method and system allows a client application programmer to interface with data provided by one or more application servers using the dynamic adaptive custom user interface.

Figure 1:
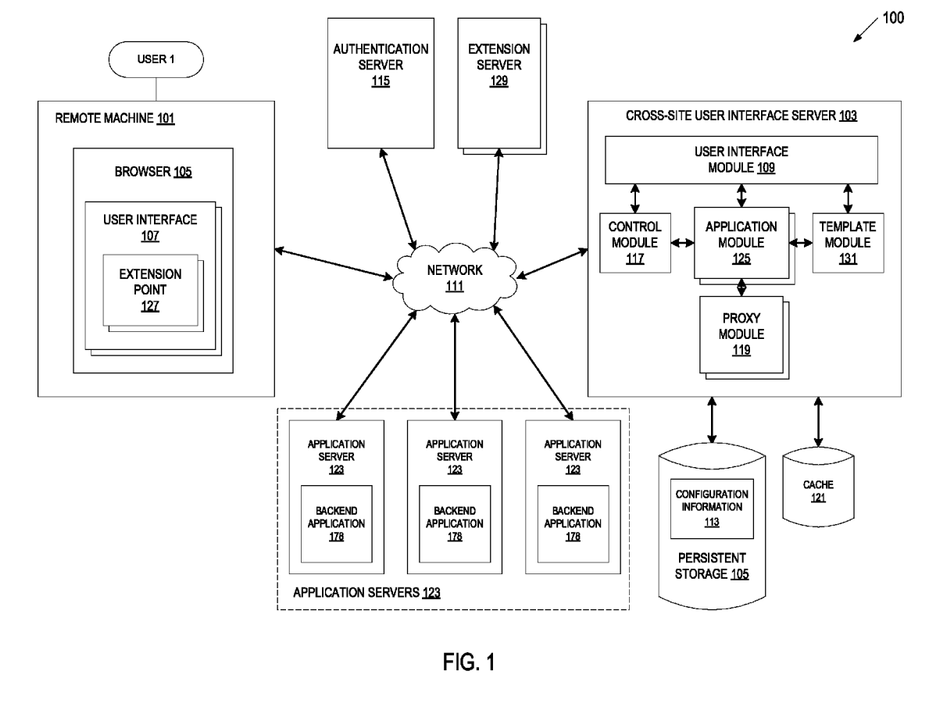
FIG. 1 is a diagram of one embodiment of a cross-site user interface system.

FIG. 1 is a diagram of one embodiment of the cross-site user interface system 100. The system 100 includes any number of remote machines 101 (client machine), a cross-site user interface server 103, a persistent storage unit 107 for saving configuration information 125, and one or more application servers 123. The cross-site user interface server 103 can be accessible to any number of remote machines 101 and users through a network 111. The network 111 can be local area network (LAN), such as an intranet within a company, a wide are network (WAN), such as the Internet or similar communication system. The network 111 can include any number of networking and computing devices including any number of wired and wireless devices.

Remote machine 101 can be any type of computing device including desktop computers, laptop computers, handheld computers or similar computing device. The remote machine 101 accesses a dynamic cross-site user interface 107 using a general purpose browser 105 or a specialized application. The user interface 107 presents data provided by a set of application servers 123.

An application server 123 hosts a service (backend application 178) and provides the data relating to the backend application 178 to populate the user interface 107. The applications servers 123 can provide any number of backend applications 178. A backend application 178 can provide any type of functionality or service. The functions may include any type of calculation, database retrieval or similar function. In one embodiment, the functions operate on local data structures and databases. In another embodiment, the functions operate on remote data structures or databases or interfaces with other remote resources. Functions can include creation, deletion, editing and viewing of data from local and remote data structures and databases. In one example implementation, the backend applications 178 are Fedora Services by Red Hat, Inc. of Raleigh, N.C.

The cross-site user interface server 103 provides the dynamic cross-site custom user interface 107. The cross-site user interface server 103 includes a user interface module 109, a control module 117, a template module 131, one or more application modules 125, one or more proxy modules 119 and similar components. This division of functionality is presented by way example for sake of clarity. One skilled in the art would understand that the functionality described could be combined into a monolithic component or subdivided into any combination of components.

The user interface 107 is a cross-site user interface in that it has one or more applications running within the user interface 107 using data provided by one or more applications servers 123. Each application corresponds to an application server 123. For example, the user interface 107 runs a build application and an announcement application. The build application retrieves build data on a build server and the announcement application retrieves data from a mailing list server. The user interface 107 displays the data (the build data and news data) from the different servers (the build server and the mailing list server) in the user interface 107. The user interface 107 is a master user interface or a user interface for a particular resource (e.g., people resource, package resource, search resource). User interfaces enable navigation between more than one user interface (e.g., a master user interface and resource user interfaces).

The cross-site user interface server 103 receives a request from a client 101 over network 111 to access a dynamic cross-site custom user interface 107. The user interface module 109 generates the dynamic cross-site user interface 107. The user interface module 109 interfaces with a persistent storage unit 105 that stores configuration information 113 for configuring the user interface 107. The persistent storage unit 105 may be a local storage unit or a remote storage unit. The persistent storage unit 105 may be a magnetic storage unit, optical storage unit, solid state storage unit or similar storage unit. The persistent storage unit 105 can be a monolithic device or a distributed set of devices. A 'set,' as used herein, refers to any positive whole number of items including one. The configuration information 113 can be stored in a database, file system or similar data storage system.

The configuration information 113 defines a set of application modules 125 for a user interface 107. The control module 117 uses the configuration information 113 to load the one or more application modules 125 for a user interface. Each application module 125 runs an application in the user interface 107. The template module 131 defines where to place an application in the user interface 107 and places the one or more applications in the user interface 107. An application can be any type of application including a business application, scientific application, game application or other type of application. An application module 125 defines the data to retrieve from an application server 123 and defines how to present the data in the user interface 107.

An application module 125 corresponds to an application server 123 and has a proxy module 119 to facilitate communication with a backend application 178 running on the application server 123. A proxy module 119 accesses the application server 123, gathers the data from the application server 123, and processes the data into an appropriate format for the user interface 107. A proxy module 119 also accesses an application server 123 to perform a task (e.g., command line task or scripted task). In one embodiment, each proxy module 119 is tied to a specific backend application 178. The proxy module 119 is provided with the uniform resource locator (URL) that identifies the associated backend application 178. The proxy module 119 is provided with a user name and password for the backend application 178 to enable authentication of a session between the respective application module 125 and backend application 178. Authentication is handled by an application server 123 or by an authentication service hosted on an authentication server 115 (e.g., Fedora Authentication Service (FAS)). The authentication server 115 associates a user with a security key and associates the user with tasks the user is authorized to perform.

A user interface 107 may include a set of extension points 127 to retrieve additional data from an application server 123. System 100 includes a cache 121 to store the data a proxy module 119 retrieves from an application server 123 and the data an extension point 127 retrieves from an application server 123. The system 100 may include a set of extension servers 129 to provide extensions corresponding to an extension point 127.

Figure 2:
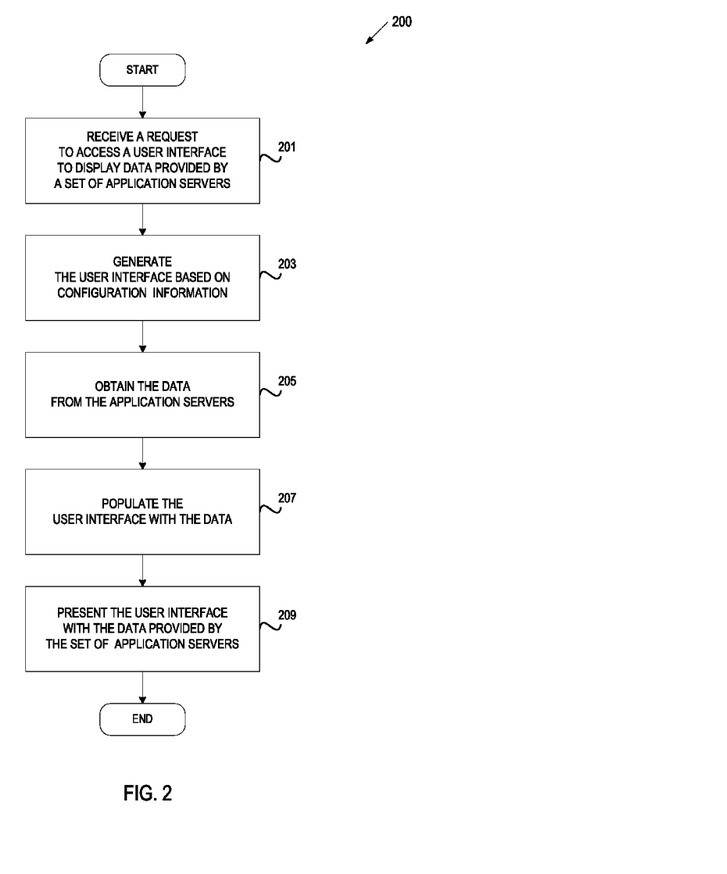
FIG. 2 is a flowchart of one embodiment of a process for providing a dynamic cross-site custom user interface using data provided by a set of application servers.

FIG. 2 is a flowchart of one embodiment of a process for providing a dynamic custom user interface using data provided by a set of application servers. In one embodiment, this process can be initiated by the user interface module receiving a request to access a dynamic cross-site user interface (Block 201). The request may include a set of user credentials (e.g., a user name and password) for accessing at least one application server providing the data to be displayed in the user interface. The request may be in the form of a login request to access a master user interface (e.g., a home web page) or may be a user input to access a user interface (e.g., a resource user interface) from the master user interface or from another resource user interface. For example, a user selects to access a package management web page by selecting a link on the home web page.

At block 203, the user interface module generates the user interface based on configuration information. The configuration information defines the applications to run in the user interface and the application modules to load for the user interface. Using the configuration information, a control module loads the application modules for the user interface and a template module places the applications in the user interface. The configuration information may be a configuration database, a configuration file, or a workflow. An example of a workflow is a build workflow defining that a build application and a navigation application be placed in the user interface. Another example of a workflow is a recovery workflow, which defines a user interface to include a management application to detect any systems that are off line due to a system failure, a provisioning application to re-boot the systems that are off line due to a system failure, and an inventory application to enter the provisioned system into the inventory. In addition, the configuration information defines the navigation from one user interface to another user interface. For example, the configuration information enables navigation from a home web page to a people web page, or from the people web page to another resource web page (e.g., a search web page).

At block 205, a proxy module obtains the data from an application server. Each application placed in the user interface corresponds to an application server providing the data to be placed in the user interface. An application module defines the data to obtain from the application server and interfaces with a corresponding proxy module to facilitate communication with the application server to obtain the data. A proxy module sends a request to access the corresponding application server. The request may provide user credentials (e.g., a user name and password) to the corresponding application server. The proxy module receives the requested data from the application server and formats the data in a format appropriate for display in the user interface.

At block 207, each application module populates the user interface with the data obtained from a corresponding application server. The application module defines how to display the data in the user interface. At block 209, the user interface module provides the user interface with the data provided by the applications servers. The user interface module further provides additional data in the user interface via an extension point in the user interface. An extension point is a marker of structured data inside the markup language (e.g., HTML) of a web page indicating that programming code of a certain type may be executed at the location of the extension point. An extension point may use data displayed in the user interface to retrieve the additional data. For example, a build proxy retrieves a table of build numbers from a build server and a build application displays one of the build numbers in a user interface. The user interface has a build extension point that uses the build number to retrieve and display the status of the build number.

Figure 3:
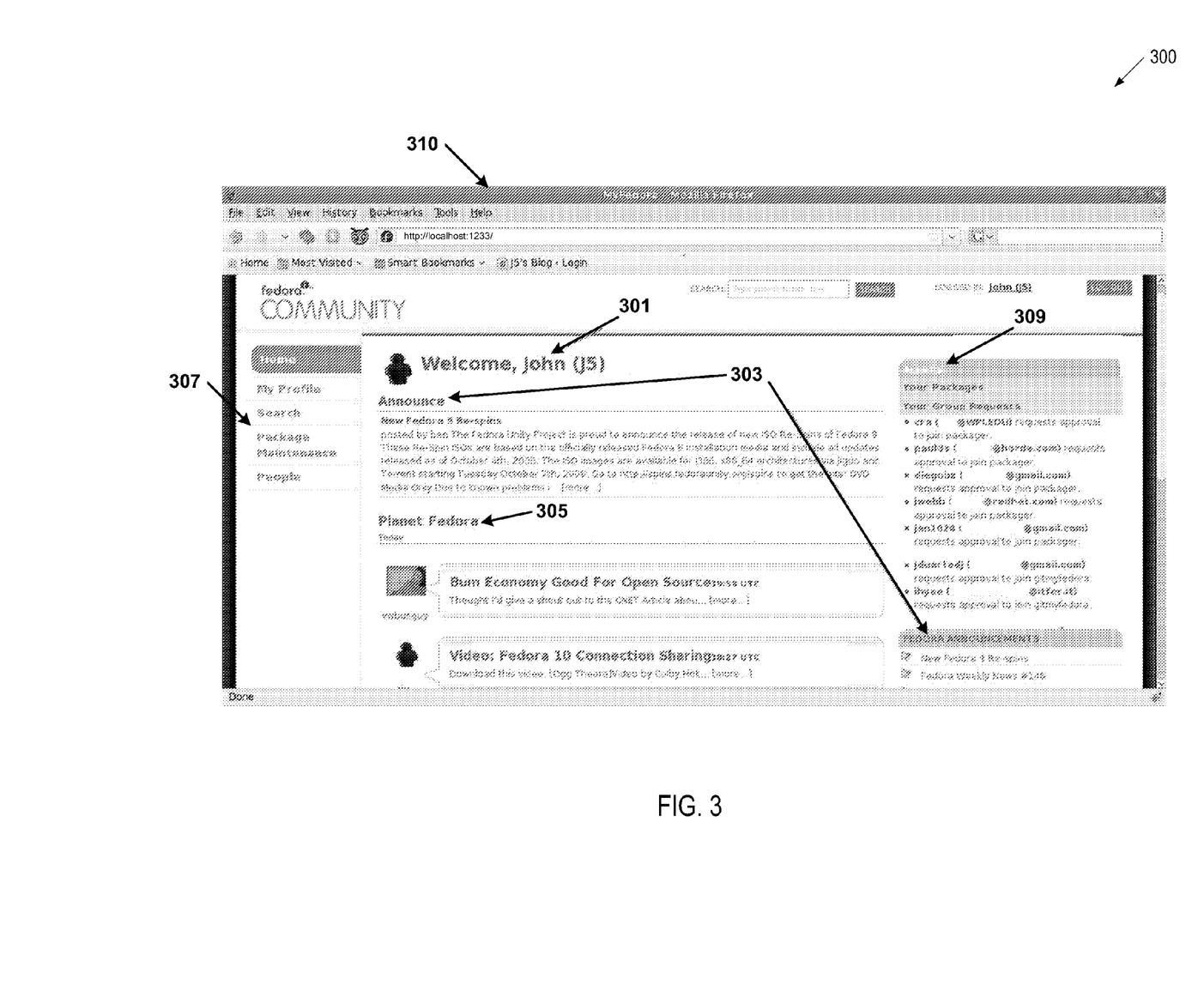
FIG. 3 is an illustration of an exemplary master dynamic cross-site custom user interface to present data provided by a set of application servers, in accordance with one embodiment of the invention.

FIG. 3 is an illustration of an exemplary master dynamic cross-site custom user interface (UI) 300 to present data provided by a set of application servers, in accordance with one embodiment of the invention. UI 300 may be accessible on a client via a browser 310. UI 300 includes a login application 301 to display data from a login server, an announcement application 303 to display data from a mailing list server, and a news application 305 to display data from a web server hosting the Planet Fedora website. UI 300 enables navigation 307 to resource web pages (e.g., search web page, package maintenance web page, people web page.) UI 300 displays additional data via an alert extension point 309. Each alert section (e.g., Your Packages, Your Group Requests) retrieves data from a different application server.

Figure 4:
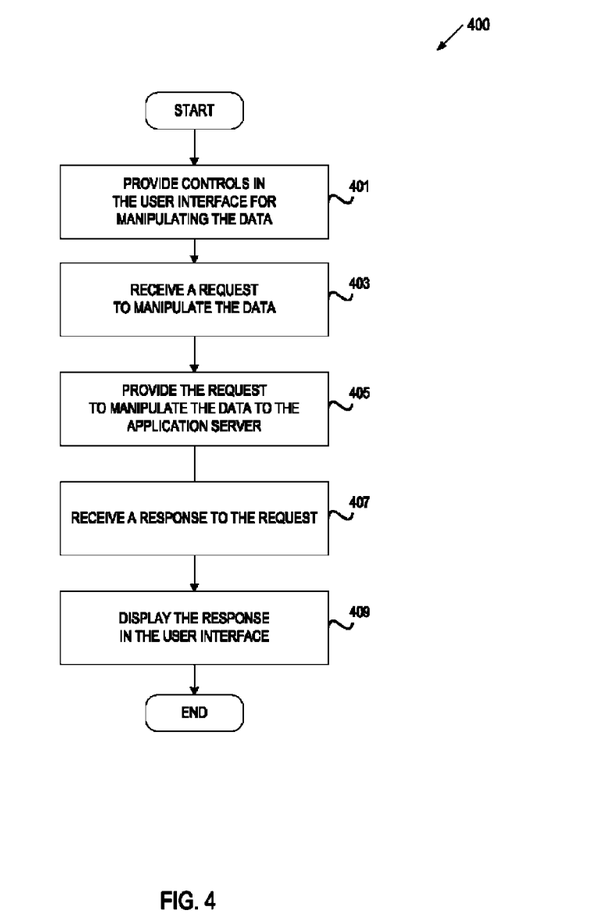
FIG. 4 is a flowchart of one embodiment of a process for manipulating the data using a dynamic cross-site custom user interface.

FIG. 4 is a flowchart of one embodiment of a process for manipulating the data in a dynamic cross-site custom user interface. In one embodiment, this process can be initiated by the user interface module providing controls in the user interface for manipulating the data (Block 401). An application module provides a control in the user interface to manipulate the data and an extension running on an extension point in the user interface provides a control in the user interface to manipulate the data. For example, an application module obtains data that a package is eligible for release and dynamically provides an additional user interface (e.g., a selection button) asking whether to release the package. In another example, an extension running on an extension point retrieves data that files are available for download and dynamically adds a download user interface (e.g., add a download option to a drop-down menu).

Figure 5A:
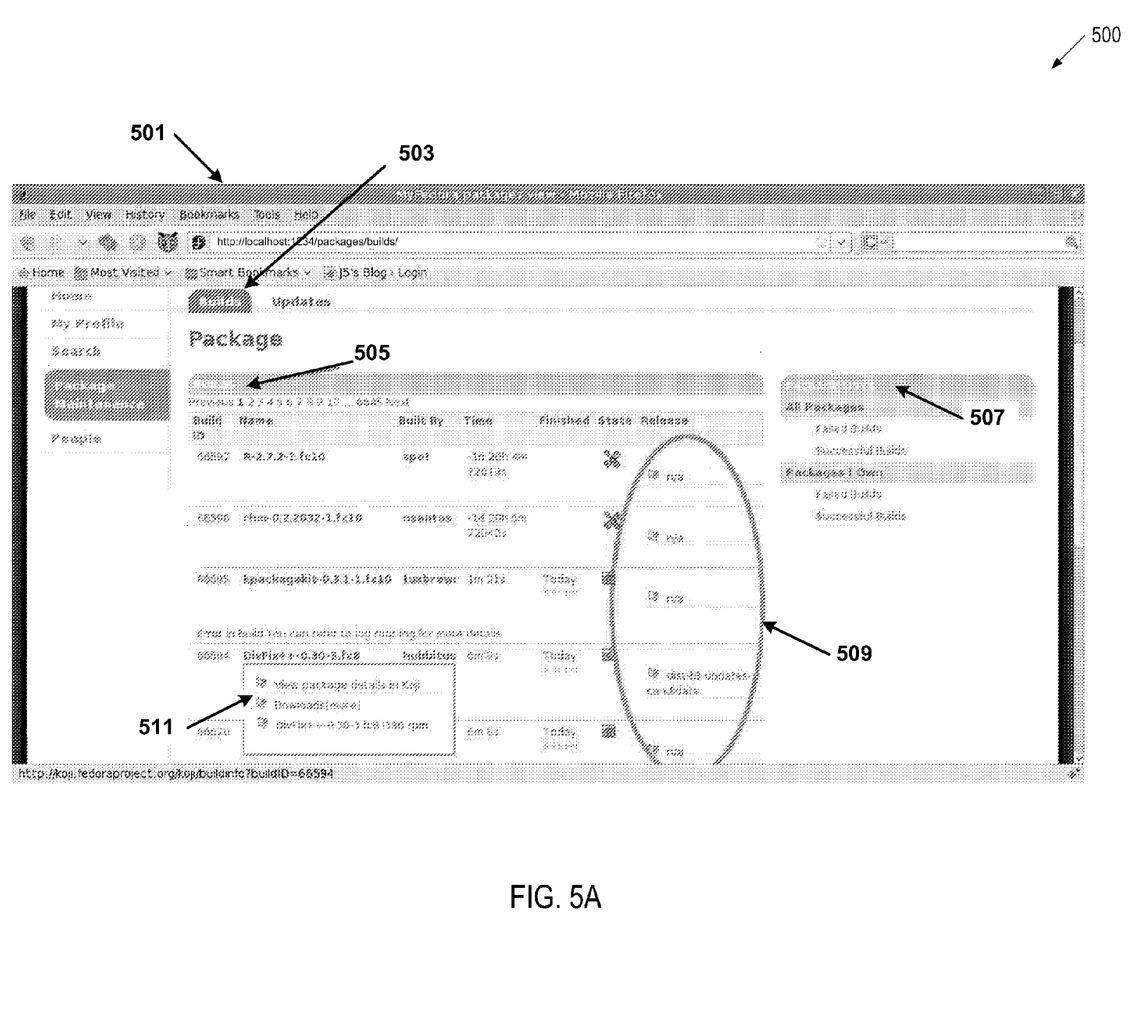
FIG. 5A is an illustration of an exemplary user interface of a package maintenance resource page providing controls to manipulate data, in accordance with one embodiment of the invention.

FIG. 5A is an illustration of an exemplary user interface 500 of a package maintenance resource page providing controls to manipulate data, in accordance with one embodiment of the invention. UI 500 may be accessible on a client machine via web browser 501. UI 500 is an example of a build page 503 running a build application 505 and a navigation application 507. The build application 505 gathers data from a build server. The navigation application 507 creates navigation for builds and updates. UI 500 also calls a release extension point 509 to determine whether any of the builds have been released or can be released. The release extension point displays additional data 509 in the user interface (e.g., the status of each build ID) and provides a control to release a package if a system user is authorized to release the package and the package is eligible for release. UI 500 also displays data indicating whether there are any files available to download and provides controls 511 to manipulate the data (e.g., view the package details, download the data).

Returning to FIG. 4, at block 403, an application module receives a request to manipulate the data via a control in the user interface. For example, the application module receives a user input to release a package. At block 405, the application module interfaces with a proxy module to forward the request to an application server able to service the request. For example, a proxy module forwards the request to release a package to a release server. The request may include a set of user credentials (e.g., a user name and password). At block 407, the proxy module receives a response from the server indicating whether the data was manipulated by the server. A server authenticates the user credentials to verify the request is authorized. For example, a release server determines whether the user credentials authorize the package to be released. If the user credentials do not authorize the package to be released, the release server does not release the package. The proxy module receives a response that the release was not authorized or a response that the package was successfully released if the use credentials authorized the release. At block 409, the proxy module provides the response to the application module to display the response in the user interface. The application module displays the response in the user interface.

Figure 5B:
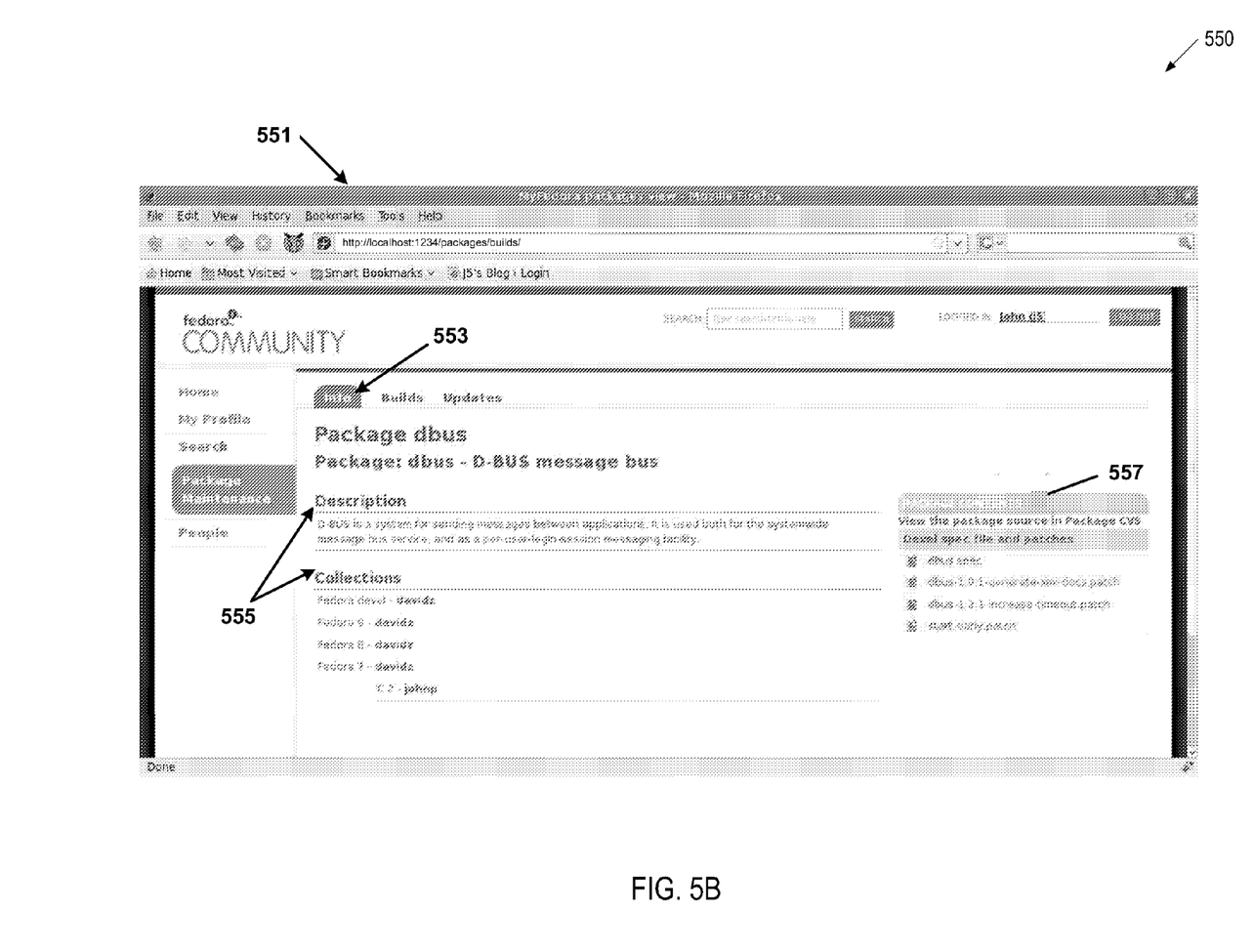
FIG. 5B is an illustration of an exemplary user interface of a package maintenance resource page, in accordance with one embodiment of the invention.

FIG. 5B is another illustration of exemplary user interface 550 of a package maintenance resource page, in accordance with one embodiment of the invention. UI 550 may be accessible on a client machine via web browser 551. UI 550 is an example of an information page 553 running an information application 555 and an update application 557. The information application 555 gathers data from a packaged server to display information about a package (e.g., D-BUS package description and collection information). The update application 557 shows all of the D-BUS packages that were released as updates.

Figure 6A:
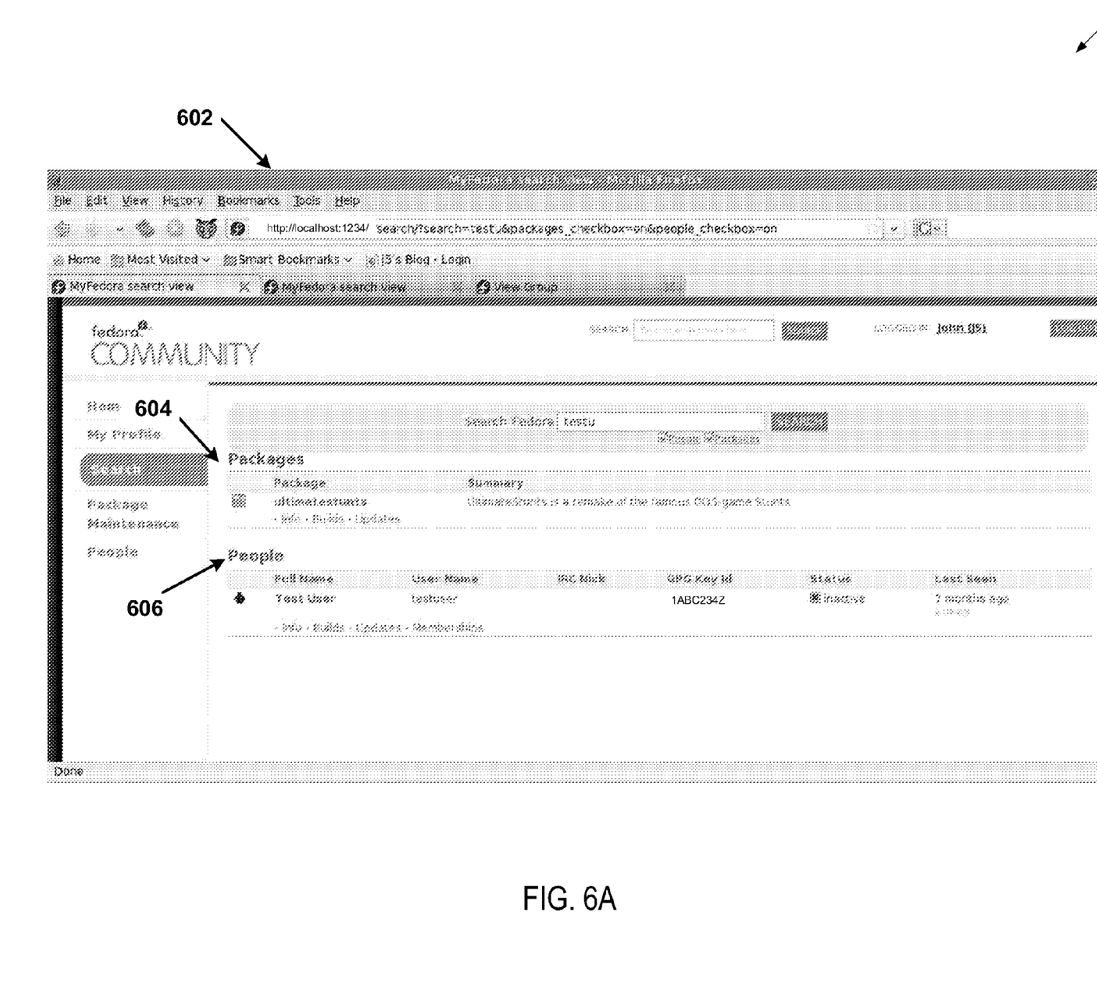
FIG. 6A is an illustration of an exemplary search resource user interface, in accordance with one embodiment of the invention.
Figure 6B:
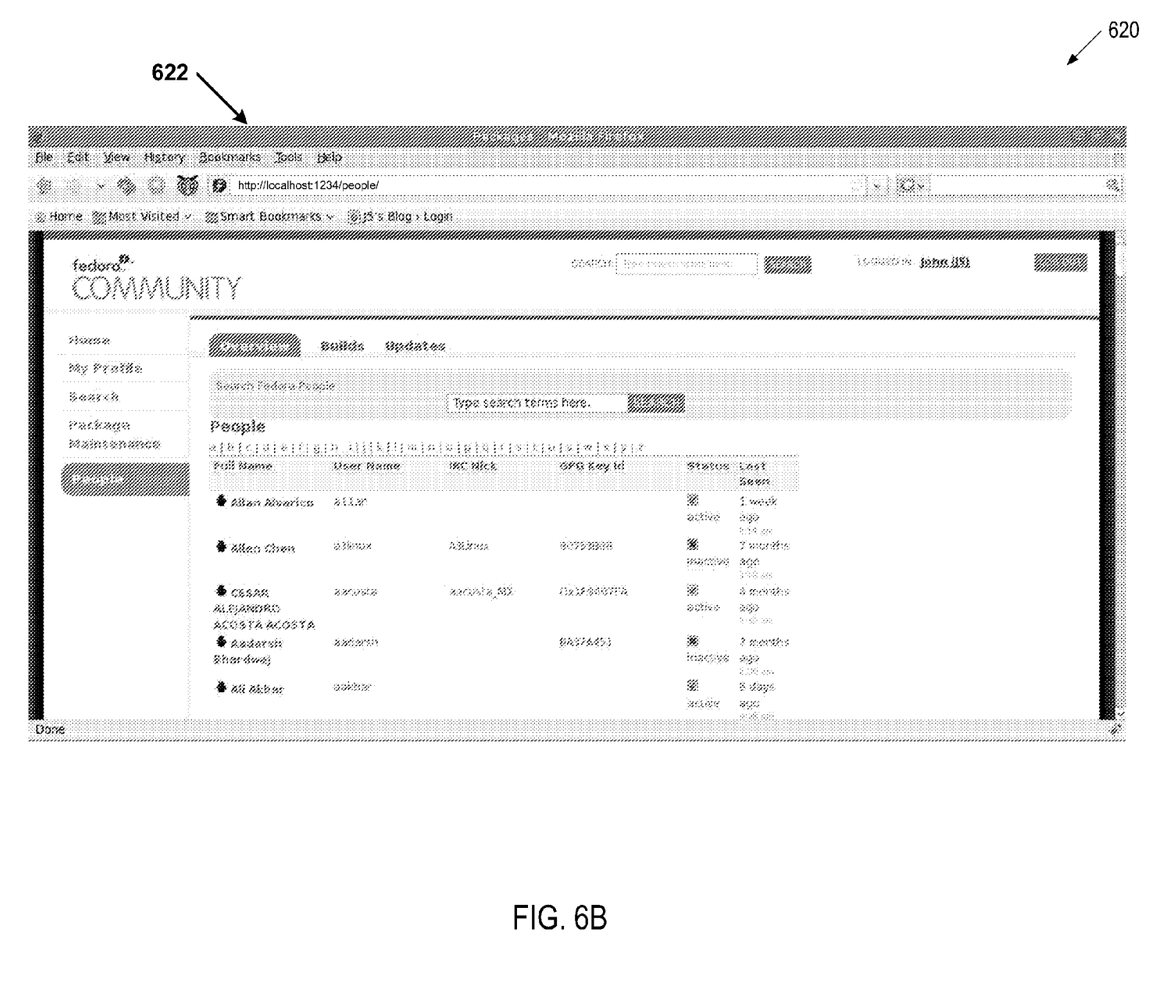
FIG. 6B is an illustration of an exemplary people resource user interface, in accordance with one embodiment of the invention.
Figure 6C:
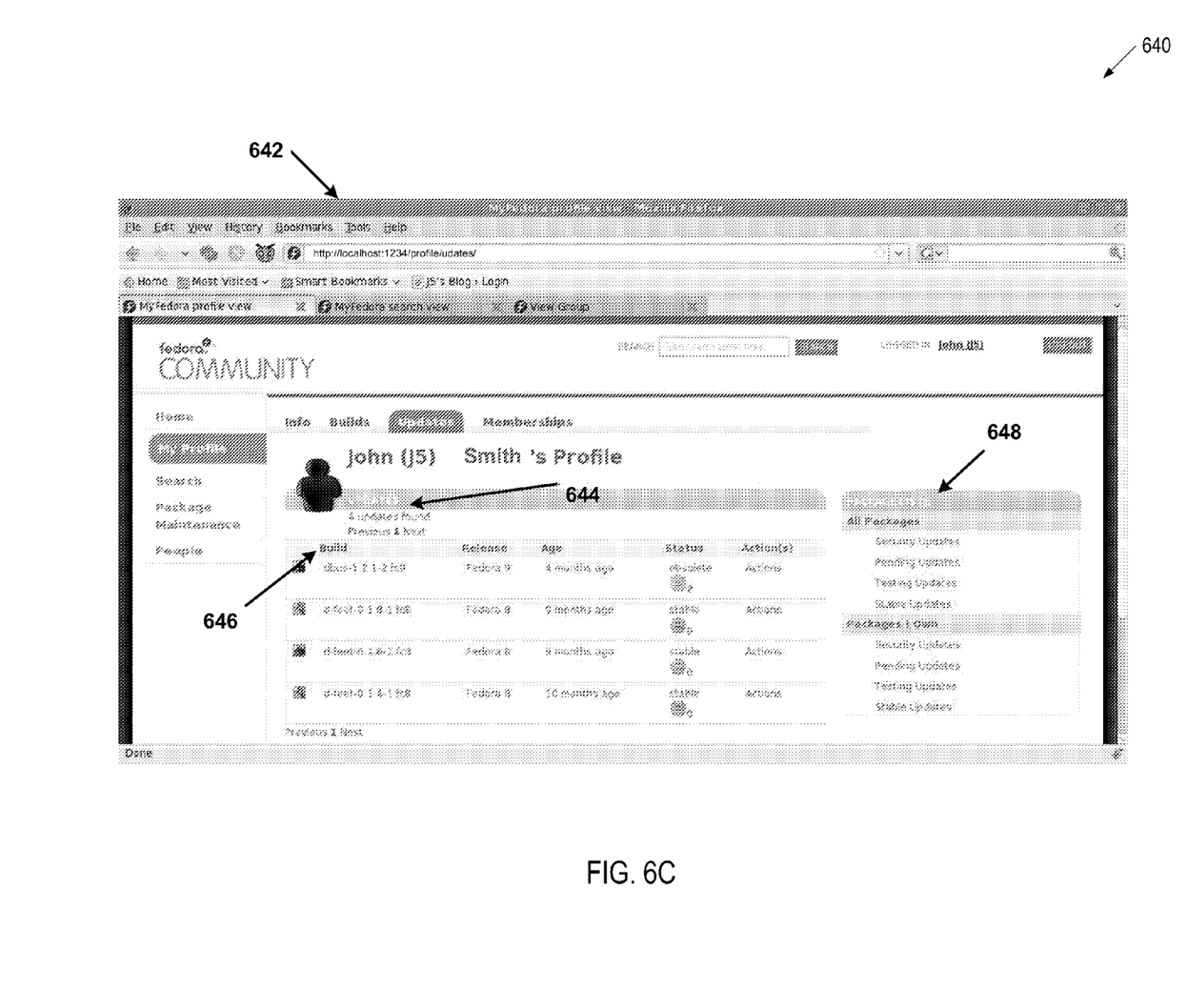
FIG. 6C is an illustration of an exemplary profile resource user interface, in accordance with one embodiment of the invention.
Figure 6D:
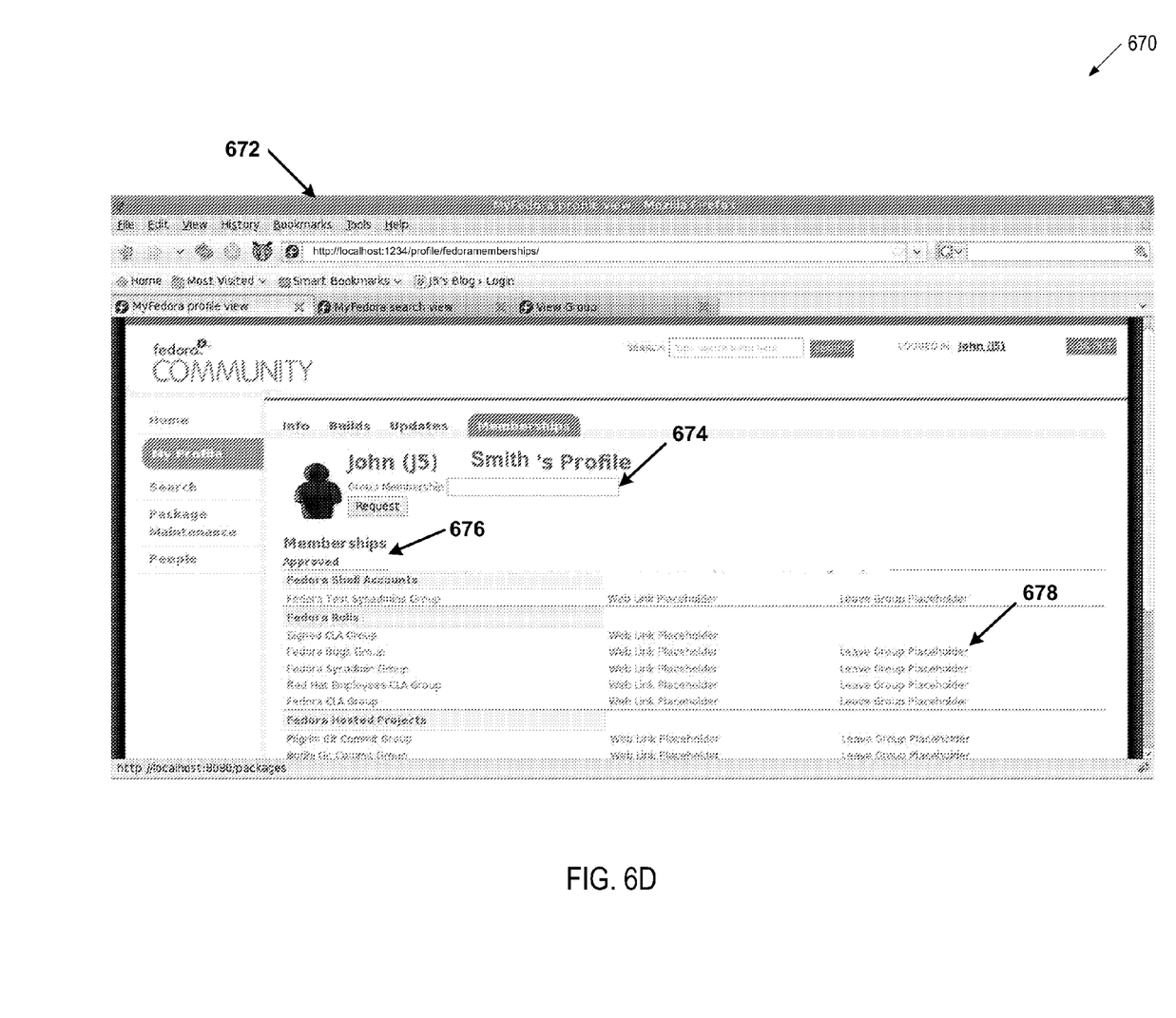
FIG. 6D is an illustration of an exemplary profile resource user interface, in accordance with one embodiment of the invention.

FIG. 6A is an illustration of exemplary search resource user interface 600, in accordance with one embodiment of the invention. UI 600 may be accessible on a client machine via web browser 602. UI 600 includes a package search application 604 and a people search application 606, each to obtain and display data from a corresponding application server. FIG. 6B is an illustration of exemplary people resource user interface 620, in accordance with one embodiment of the invention. UI 620 may be accessible on a client machine via web browser 622. UI 620 includes one or more applications obtaining and displaying data from corresponding application servers relating to people who are registered with a service (e.g., Fedora). FIG. 6C is an illustration of exemplary profile resource user interface 640, in accordance with one embodiment of the invention. UI 640 may be accessible on a client machine via web browser 642. UI 640 includes an update application 644 to retrieve and obtain data from an update server and a build application 646 to retrieve and obtain data from a build server. UI 640 also includes a navigation application 648 to build navigation for builds and updates. FIG. 6D is an illustration of exemplary profile resource user interface 670, in accordance with one embodiment of the invention. UI 670 may be accessible on a client machine via web browser 672. UI 740 includes a request membership application 674 to request membership to a group via a membership server and a membership application 744 to display data relating to the membership of a user and providing a control 678 to remove membership from a particular group.

Figure 7:
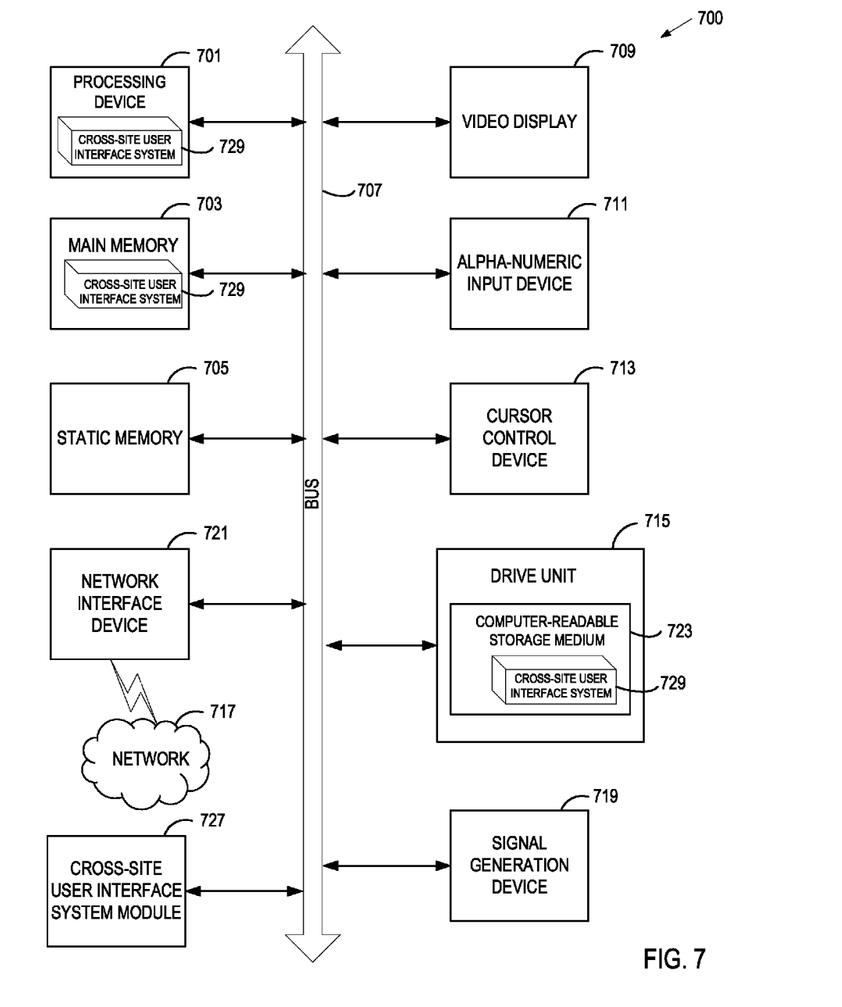
FIG. 7 is a diagram of one embodiment of the cross-site user interface system.

FIG. 7 is a diagram of one embodiment of a computer system for providing a dynamic adaptive cross-site custom user interface. Within the computer system 700 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 701, a main memory 703 (e.g., read-only memory (ROM), flash memory, dynamic random access memory (DRAM) such as synchronous DRAM (SDRAM) or Rambus DRAM (RDRAM), etc.), a static memory 705 (e.g., flash memory, static random access memory (SRAM), etc.), and a secondary memory 715 (e.g., a data storage device in the form of a drive unit, which may include fixed or removable computer-readable storage medium), which communicate with each other via a bus 707.

Processing device 701 represents one or more general-purpose processing devices such as a microprocessor, central processing unit, or the like. More particularly, the processing device 701 may be a complex instruction set computing (CISC) microprocessor, reduced instruction set computing (RISC) microprocessor, very long instruction word (VLIW) microprocessor, processing device implementing other instruction sets, or processing devices implementing a combination of instruction sets. Processing device 701 may also be one or more special-purpose processing devices such as an application specific integrated circuit (ASIC), a field programmable gate array (FPGA), a digital signal processing device (DSP), network processing device, or the like. Processing device 701 is configured to execute the cross-site user interface system 725 for performing the operations and steps discussed herein.

The computer system 700 may further include a network interface device 721. The computer system 700 also may include a video display unit 709 (e.g., a liquid crystal display (LCD) or a cathode ray tube (CRT)) connected to the computer system through a graphics port and graphics chipset, an alphanumeric input device 711 (e.g., a keyboard), a cursor control device 713 (e.g., a mouse), and a signal generation device 719 (e.g., a speaker).

The secondary memory 715 may include a computer-readable storage medium (or more specifically a computer-readable storage medium) 723 on which is stored one or more sets of instructions (e.g., the cross-site user interface system 725) embodying any one or more of the methodologies or functions described herein. The cross-site user interface system 725 may also reside, completely or at least partially, within the main memory 703 and/or within the processing device 701 during execution thereof by the computer system 700, the main memory 703 and the processing device 701 also constituting computer-readable storage media. The cross-site user interface system 725 may further be transmitted or received over a network 717 via the network interface device 721.

The computer-readable storage medium 723 may also be used to store the cross-site user interface system 725 persistently. While the computer-readable storage medium 723 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 727, components and other features described herein (for example in relation to FIG. 1) can be implemented as discrete hardware components or integrated in the functionality of hardware components such as ASICS, FPGAs, DSPs or similar devices. In addition, the modules 727 can be implemented as firmware or functional circuitry within hardware devices. Further, the modules 727 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "providing," "configuring," "loading," "placing," "gathering," "displaying," "receiving," "formatting," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer.

Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for installing live operating systems to removable storage devices has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method comprising:
   generating, by a server computing system, a user interface using configuration information for a plurality of different data applications;
   obtaining application data from a plurality of different data application servers to populate the user interface;
   providing the user interface populated with the application data obtained from the plurality of different data application servers to a remote machine;
   receiving a request via the user interface from the remote machine to manipulate the application data, wherein manipulating the application data comprises manipulating data in a data structure of one of the plurality of data application servers; and
   providing a response to the remote machine indicating whether the application data is manipulated.

2. The method of claim 1, further comprising:
   displaying additional application data in the user interface via an extension point in the user interface.

3. The method of claim 1, wherein obtaining application data comprises:
   loading a plurality of application modules that correspond to the plurality of different data application servers, wherein an application module defines the application data to be obtained from the corresponding data application server.

4. The method of claim 3, wherein providing the user interface comprises:
   receiving the application data from one of a plurality of proxy modules, wherein each of the plurality of application modules corresponds to one of the plurality of proxy modules.

5. The method of claim 4, wherein each of the plurality of proxy modules corresponds to one of the plurality of different data application servers.

6. The method of claim 1, further comprising:
   configuring the user interface using the configuration information, wherein the configuration information defines the plurality of different data applications to place in the user interface;
   loading the plurality of different data applications based on the configuration information; and
   placing the plurality of different data applications in the user interface.

7. The method of claim 1, further comprising:
   providing controls in the user interface for manipulating the application data;
   providing the request to manipulate the application data to one of the plurality of different data application servers able to process the request, wherein the request comprises a set of user credentials; and
   receiving a response to the request, wherein the response indicates whether the application data was manipulated by the data application server.

8. The method of claim 1, wherein obtaining application data from a plurality of different data application servers comprises:
   providing a set of user credentials to a corresponding data application server;
   gathering the application data from the corresponding data application server;
   formatting the application data, wherein the format of the application data is defined by a corresponding application module; and
   providing the application data to the corresponding application module.

9. The method of claim 1, wherein the user interface is a master user interface or a resource user interface.

10. A non-transitory computer-readable storage medium, including instructions that, when executed by a computer system, cause the computer system to perform a set of operations comprising:
    generating a user interface using configuration information for a plurality of different data applications;
    obtaining application data from a plurality of different data application servers to populate the user interface;
    providing the user interface populated with the application data obtained from the plurality of different data application servers to a remote machine;
    receiving a request via the user interface from the remote machine to manipulate the application data, wherein manipulating the application data comprises manipulating data in a data structure of one of the plurality of data application servers; and
    providing a response to the remote machine indicating whether the application data is manipulated.

11. The non-transitory computer-readable storage medium of claim 10, further comprising:
    displaying additional application data in the user interface via an extension point in the user interface.

12. The non-transitory computer-readable storage medium of claim 10, wherein obtaining application data comprises:
    loading a plurality of application modules that correspond to the plurality of different application servers, wherein an application module defines the application data to be obtained from the corresponding data application server.

13. The non-transitory computer-readable storage medium of claim 12, wherein providing the user interface by a plurality of application modules comprises:
receiving the application data from one of a plurality of proxy modules, wherein each of the plurality of application modules corresponds to one of the plurality of proxy modules.

14. The non-transitory computer-readable storage medium of claim 13, wherein each of the plurality of proxy modules corresponds to one of the plurality of different data application servers.

15. The non-transitory computer-readable storage medium of claim 10, further comprising:
configuring the user interface using the configuration information, wherein the configuration information defines the plurality of different data applications to place in the user interface;
loading the plurality of different data applications based on the configuration information; and
placing the plurality of different data applications in the user interface.

16. The non-transitory computer-readable storage medium of claim 10, further comprising:
providing controls in the user interface for manipulating the application data;
providing the request to manipulate the application data to one of the plurality of different data application servers able to process the request, wherein the request comprises a set of user credentials; and
receiving a response to the request, wherein the response indicates whether the application data was manipulated by the data application server; and
displaying the response to the request in the user interface.

17. The non-transitory computer-readable storage medium of claim 10, wherein obtaining application data from a plurality of different data application servers comprises:
providing a set of user credentials to the corresponding data application server;
gathering the application data from the corresponding data application server;
formatting the application data, wherein the format of the application data is defined by a corresponding application module; and
providing the application data to the corresponding application module.

18. The non-transitory computer-readable storage medium of claim 10, wherein the user interface is a master user interface or a resource user interface.

19. A system comprising:
a memory;
a processing device coupled to the memory;
a plurality of proxy modules executable from the memory by the processing device to obtain application data to be displayed in a user interface from a plurality of different data application servers to populate the user interface;
a plurality of application modules, wherein each of the plurality of application modules is coupled to a corresponding proxy module, the plurality of application modules to run the plurality of different data applications to display the application data; and
a user interface module, coupled to the plurality of application modules, the user interface module to generate the user interface using configuration information for the plurality of different data applications to provide the user interface populated with the application data obtained from the plurality of different data application servers to a remote machine, receive a request via the user interface from the remote machine to manipulate the application data, wherein manipulating the application data comprises manipulating data in a data structure of one of the plurality of data application servers; and provide a response to the remote machine indicating whether the application data is manipulated.

20. The system of claim 19, wherein the user interface module is further to configure the user interface using the configuration information, wherein the configuration information defines the plurality of different data applications to place in the user interface.

21. The system of claim 19, further comprising:
a control module, coupled to the plurality of application modules, the control module to load the plurality of application modules for the user interface; and
a template module, coupled to plurality of application modules, the template module to place the plurality of application modules in the user interface.

22. The system of claim 19, wherein the user interface module is further to display additional application data in the user interface via an extension point in the user interface.

* * * * *